US012715222B2

(12) United States Patent
Iinuma et al.

(10) Patent No.: US 12,715,222 B2
(45) Date of Patent: Aug. 25, 2026

(54) CARTRIDGE, PRINTING APPARATUS, AND METHOD INCLUDING A CHANNEL FORMING UNIT HAVING A CHANNEL TO SUPPLY LIQUID FROM A STORAGE UNIT TO A PRINT ELEMENT BOARD

(71) Applicant: CANON KABUSHIKI KAISHA, Tokyo (JP)

(72) Inventors: Keisuke Iinuma, Kanagawa (JP); Wataru Takahashi, Kanagawa (JP); Tatsuo Nanjo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 18/752,383

(22) Filed: Jun. 24, 2024

(65) Prior Publication Data

US 2025/0010628 A1 Jan. 9, 2025

(30) Foreign Application Priority Data

Jul. 7, 2023 (JP) ................................ 2023-112199

(51) Int. Cl.
*B41J 2/175* (2006.01)

(52) U.S. Cl.
CPC ....... *B41J 2/17553* (2013.01); *B41J 2/17513* (2013.01); *B41J 2/17523* (2013.01); *B41J 2/1753* (2013.01); *B41J 2/17559* (2013.01)

(58) Field of Classification Search
CPC B41J 2/17553; B41J 2/17513; B41J 2/17523; B41J 2/1753; B41J 2/17559
USPC ........................................................... 345/87
See application file for complete search history.

(56) References Cited

U.S. PATENT DOCUMENTS

2004/0159298 A1* 8/2004 Ino ..................... F02M 35/1277 123/184.21
2008/0049080 A1 2/2008 Hayashi et al. ......... B41J 2/175
2008/0252705 A1* 10/2008 Amma .................. B41J 2/1753 347/86
2009/0179979 A1 7/2009 Nanjo et al. ............ B41J 2/175
(Continued)

FOREIGN PATENT DOCUMENTS

JP 2008-260199 10/2008
JP 2010089324 A * 4/2010

OTHER PUBLICATIONS

U.S. Appl. No. 18/628,695, filed Apr. 6, 2024.
(Continued)

*Primary Examiner* — Mark Edwards
(74) *Attorney, Agent, or Firm* — Venable LLP

(57) ABSTRACT

A cartridge including a box unit to store a liquid, a print element board for ejecting the liquid from an array of ejection ports, a channel forming unit having a channel to supply the liquid from the box unit to the print element board, the channel forming unit having a first surface to support the print element board and a second surface closer to the box unit than is the first surface, and a joint unit formed of a first resin filled in a space between the box unit and the channel forming unit and that joins the box unit and the channel forming unit together. The first resin is injected from a gate section in the channel forming unit, in a space between the box unit and the channel forming unit, and a buffer section stores the first resin excessively filled in a finally-filled portion of the first resin.

15 Claims, 18 Drawing Sheets

(56) References Cited

U.S. PATENT DOCUMENTS

| | | | | |
|---|---|---|---|---|
| 2009/0213195 | A1* | 8/2009 | Albertin | B41J 2/17559 347/87 |
| 2011/0096128 | A1 | 4/2011 | Ogura et al. | B41J 2/175 |
| 2012/0200647 | A1 | 8/2012 | Miyashita et al. | B41J 2/175 |
| 2012/0300003 | A1 | 11/2012 | Takada et al. | B41J 2/175 |
| 2013/0222488 | A1 | 8/2013 | Miyashita et al. | B41J 2/175 |
| 2013/0222491 | A1 | 8/2013 | Nanjo et al. | B41J 2/175 |
| 2015/0343793 | A1 | 12/2015 | Takada et al. | B01D 19/00 |
| 2015/0375512 | A1 | 12/2015 | Kondo et al. | B41J 2/175 |
| 2015/0375514 | A1 | 12/2015 | Koshikawa et al. | B41J 2/175 |
| 2016/0200113 | A1 | 7/2016 | Nanjo et al. | B41J 2/175 |
| 2016/0200114 | A1 | 7/2016 | Nanjo et al. | B41J 2/175 |
| 2017/0087863 | A1 | 3/2017 | Miyashita et al. | B41J 2/175 |
| 2017/0120606 | A1 | 5/2017 | Koshikawa et al. | B41J 2/175 |
| 2017/0120608 | A1 | 5/2017 | Takaoka et al. | B41J 2/175 |
| 2017/0120609 | A1 | 5/2017 | Kimura et al. | B41J 2/175 |
| 2017/0120612 | A1 | 5/2017 | Fukuchi et al. | B41J 2/175 |
| 2017/0120613 | A1 | 5/2017 | Ikebe et al. | B41J 2/175 |
| 2017/0136776 | A1 | 5/2017 | Shiba et al. | B41J 2/175 |
| 2017/0151797 | A1 | 6/2017 | Hayashi et al. | B41J 2/175 |
| 2017/0151803 | A1 | 6/2017 | Yoshii et al. | B41J 2/175 |
| 2019/0168508 | A1 | 6/2019 | Kondo | B41J 2/14 |
| 2020/0079096 | A1 | 3/2020 | Iinuma et al. | B41J 2/175 |
| 2021/0300052 | A1 | 9/2021 | Takei et al. | B41J 2/175 |
| 2021/0300055 | A1 | 9/2021 | Koshikawa et al. | B41J 2/175 |
| 2021/0362506 | A1 | 11/2021 | Kishikawa et al. | B41J 2/175 |
| 2021/0387455 | A1* | 12/2021 | Hasegawa | B41J 2/1637 |
| 2022/0097388 | A1 | 3/2022 | Nanjo et al. | B41J 2/175 |
| 2023/0302806 | A1 | 9/2023 | Noda et al. | B41J 2/175 |
| 2024/0173986 | A1 | 5/2024 | Omura et al. | B41J 2/175 |
| 2024/0198689 | A1 | 6/2024 | Murase et al. | B41J 2/175 |
| 2024/0286787 | A1 | 8/2024 | Noda et al. | B65D 1/36 |
| 2024/0300245 | A1 | 9/2024 | Hayasaka et al. | B41J 2/175 |

OTHER PUBLICATIONS

U.S. Appl. No. 18/737,989, filed Jun. 8, 2024.
U.S. Appl. No. 18/762,423, filed Jul. 2, 2024.
U.S. Appl. No. 18/771,686, filed Jul. 12, 2024.
U.S. Appl. No. 18/778,955, filed Jul. 20, 2024.
U.S. Appl. No. 18/778,960, filed Jul. 20, 2024.
U.S. Appl. No. 18/910,371, filed Oct. 9, 2024.

* cited by examiner

CARTRIDGE, PRINTING APPARATUS, AND METHOD INCLUDING A CHANNEL FORMING UNIT HAVING A CHANNEL TO SUPPLY LIQUID FROM A STORAGE UNIT TO A PRINT ELEMENT BOARD

CLAIM TO PRIORITY

This application claims the benefit of Japanese Patent Application No. 2023-112199 filed Jul. 7, 2023, which is hereby incorporated by reference herein in its entirety.

BACKGROUND OF THE INVENTION

Field of the Invention

The disclosure relates to a cartridge, a printing apparatus, and a method.

Description of the Related Art

As a conventional ink cartridge, there is known a structure as described in Japanese Patent Laid-Open No. 2008-260199. The ink cartridge in Japanese Patent Laid-Open No. 2008-260199 includes a case for storing inks and a print element board for ejecting the inks. The inside of the case is partitioned into three regions adjacent to each other and absorbers for retaining the different inks are stored in the respective regions. The inks retained in the absorbers are supplied to the print element board provided below the case through filters and ink channels. In the print element board, ejection port arrays in each of which multiple ejection ports are arrayed extend in a direction crossing a scanning direction of the ink cartridge, and the multiple ejection port arrays for the respective ink colors are arrayed in the scanning direction.

In the conventional ink cartridge, the channels from the tank chambers to the print element board are formed by inserting a channel plate into the tank case and welding the channel plate to the tank case during manufacturing. In a case when three tank chambers are adjacent to each other as in the arrangement in the conventional ink cartridge, the channels from the respective tank chambers to the print element board can be formed by using the channel plate.

However, in the ink cartridge in Japanese Patent Laid-Open No. 2008-260199, it is necessary to arrange the tank chambers close to a side where to insert the channel plate in order to couple the tank chambers and the channels of the channel plate. For this reason, a degree of freedom in designing the ink cartridge may be limited.

A method for avoiding arranging the tank chambers close to the side where to insert the channel plate is to extend the channel plate toward the rear of the ink cartridge (the side opposite to the side where to insert the channel plate). However, in this case, there is a concern that the size of the apparatus may increase due to the ink cartridge thus enlarged.

SUMMARY OF THE INVENTION

Therefore, the disclosure provides a cartridge, a printing apparatus, and a cartridge production method, which can enhance a degree of freedom in designing the cartridge and prevent an increase in the size of the apparatus.

To this end, a cartridge of the disclosure is a liquid cartridge including an element board in which ejection port arrays are formed by arraying multiple ejection ports each configured to eject a liquid, and a case that supports the element board, wherein the case includes multiple tank chambers, and liquids in the tank chambers are ejected from the ejection ports in the element board. The case is formed by combining a box unit in which the multiple tank chambers are provided and a channel forming unit in which channels from the tank chambers to the element board are formed. The box unit and the channel forming unit are joined together by injecting a molten first resin into a space formed between the box unit and the channel forming unit in the case where these units are combined.

According to the disclosure, it is possible to provide a cartridge, a printing apparatus, and a method, which can enhance a degree of freedom in designing the cartridge and prevent an increase in the size of the apparatus.

Further features of the disclosure will become apparent from the following description of exemplary embodiments with reference to the attached drawings.

DESCRIPTION OF THE EMBODIMENTS

First Embodiment

Hereafter, embodiments of the present disclosure will be described in reference to the drawings.

Figure 1:
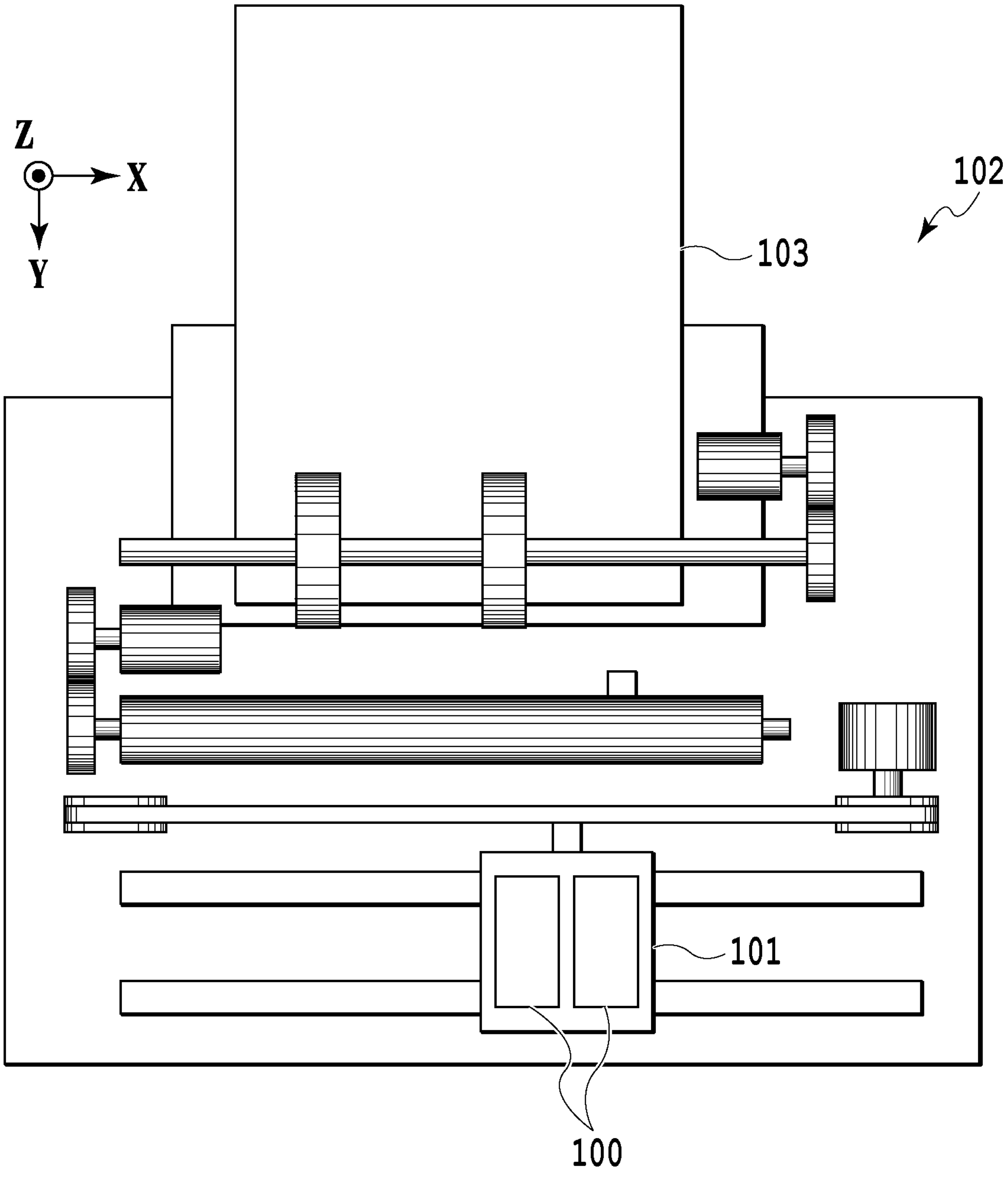
FIG. 1 is a schematic diagram illustrating an inkjet printing apparatus.

FIG. 1 is a schematic diagram illustrating an inkjet printing apparatus (hereafter will be also referred to as the printing apparatus) 102 to which the present embodiment is applicable. In FIG. 1, an X direction indicates a scanning direction of a carriage, a Y direction indicates a conveyance direction of a printing medium, and a Z direction indicates a vertically upward direction. The following diagrams for explaining a single cartridge also illustrate the same XYZ axes as in FIG. 1 based on a case when the cartridge is attached to the printing apparatus. The printing apparatus 102 is configured such that liquid cartridges 100 can be mounted on a carriage 101, and performs printing in such a way that the liquid cartridges 100 mounted on the carriage 101 eject liquids (hereafter also referred to as the inks) to a printing medium 103 while moving relative to the printing medium 103. In sum, the printing apparatus 102 is a serial-type printing apparatus. In ejection, while the carriage 101 is reciprocating in the X directions, the liquid cartridges (hereafter will be also simply referred to as the cartridges) 100 eject the liquids. An image is formed on the printing medium 103 by conveying the printing medium 103 by a predetermined amount in a direction (Y direction) perpendicular to the reciprocating directions of the carriage 101 along with the ejection of the liquids from the cartridges 100.

Figure 2:
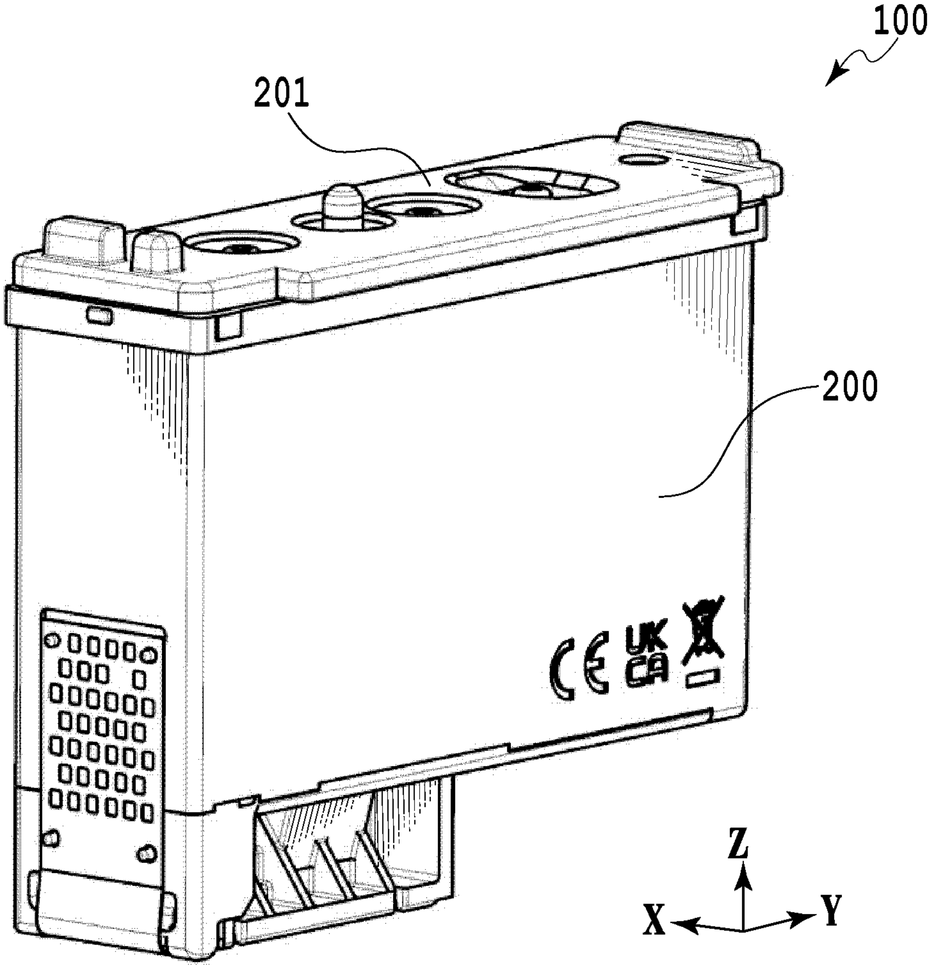
FIG. 2 is an external perspective view illustrating a cartridge.
Figure 3:
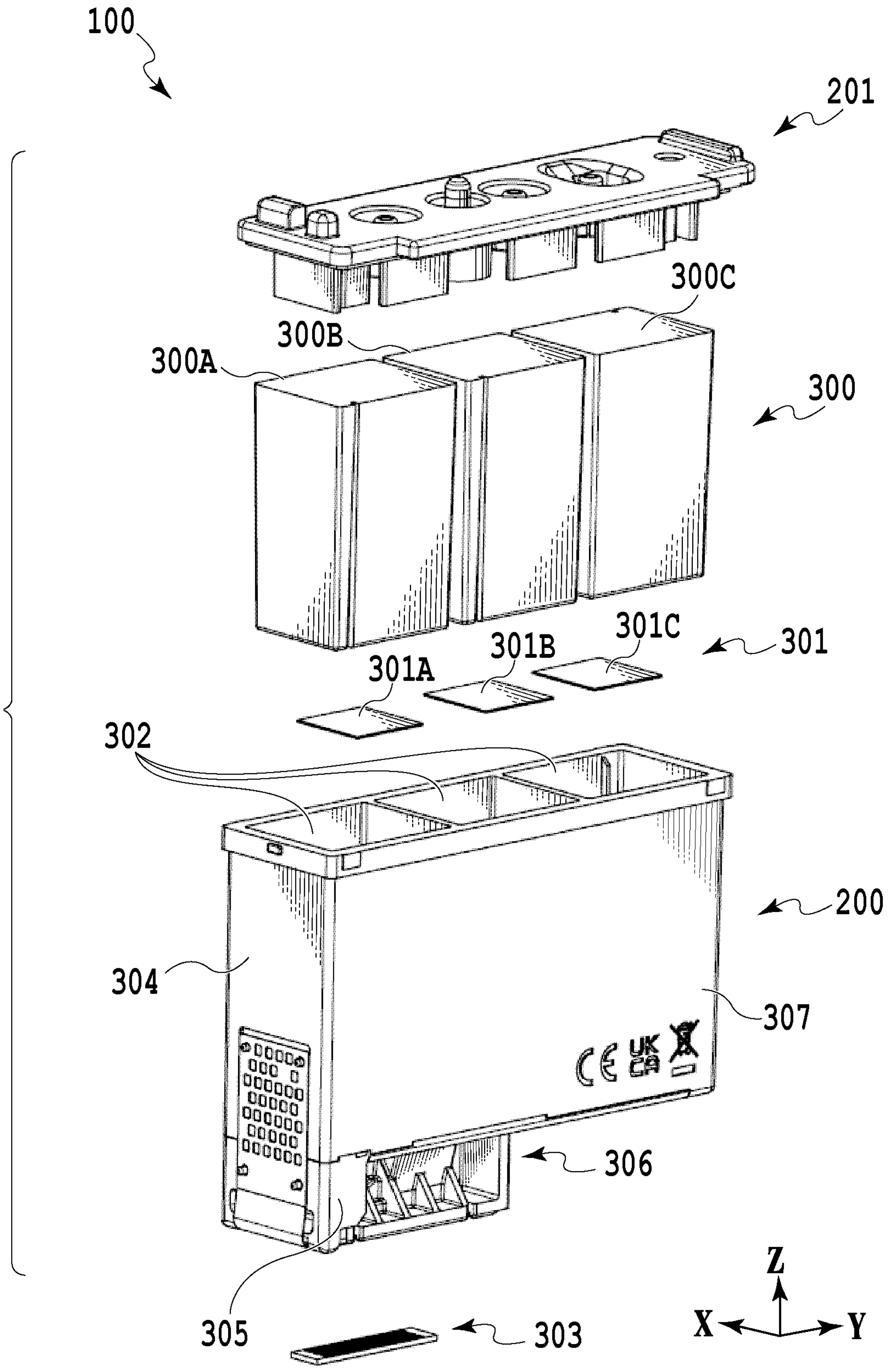
FIG. 3 is an exploded perspective view of the cartridge.

FIG. 2 is an external appearance perspective view illustrating the cartridge 100 and FIG. 3 is an exploded perspective view of the cartridge 100. The cartridge 100 includes a print element board 303 for ejecting the inks, a case 200 including tank chambers 302 for storing filters 301 and absorbers 300, and a lid 201. Each tank chamber 302 is capable of storing a liquid and includes the absorber 300 that retains the liquid stored, and the liquid retained in the absorber 300 is supplied to ejection ports in the print element board 303 via a channel section communicating with the tank chamber 302. In the present embodiment, the absorber 300 is inserted in the tank chamber 302 as a negative pressure generation means for retaining the liquid. Instead, the tank chamber 302 is capable of similarly retaining the liquid with a structure employing a negative pressure generation unit such as a pressure control unit or a circulation unit.

The liquid stored in the tank chamber 302 is a color ink in general, and inks for cyan, magenta, and yellow are stored in the respective tank chambers. In the present embodiment, the cartridge 100 is described by taking a structure including three tank chambers 302 as an example, but should not be limited to this structure. Instead, the present embodiment is also applicable to a structure including more than three tank chambers. For example, the same idea is applicable also in the case of a single cartridge for four colors additionally including black.

In the cartridge 100 in the present embodiment, the tank chambers 302 are formed such that the absorbers 300 are arranged linearly in the Y direction. The linear arrangement of the absorbers 300 in the Y direction as described above makes it possible to narrow the width of the cartridge 100 in the X direction.

In addition, the linear arrangement of the absorbers 300 in the Y direction also makes it possible to easily insert the absorbers 300 in the manufacturing step. In addition, since the width of each absorber in the X direction can be approximately equalized to the width of the cartridge, the amount of each ink stored can be secured even if the width of the entire cartridge in the X direction is narrowed. In the present embodiment, the absorbers 300 are arranged in the order of an absorber 300A, an absorber 300B, and an absorber 300C from the upstream side in the Y direction.

Each absorber 300 is desirably in a shape close to a rectangular parallelepiped from the viewpoint of liquid supply performance. In a case when the size of the absorber 300 is changed with the amount of the liquid stored taken into consideration, it is preferable to extend the absorber 300 in the direction of gravity. If the absorber 300 is changed in size and extended in the scanning direction, the scanning direction is the width direction of the cartridge 100 and the width of the cartridge 100 is widened. Instead, if the absorber 300 is changed in size and extended in the ejection port array direction of the ejection port array, the length of the channel section to the print element board 303 becomes too long relative to the width thereof, which is undesirable because the flow resistance in the liquid supply is high.

The print element board 303 is an ejection unit capable of ejecting the inks, is supported by the case 200, and is arranged on a bottom surface of the case 200 on a lower side in the direction of gravity. The print element board 303 is arranged near the lower sides of the absorber 300A and the absorber 300B, and is not arranged below the absorber 300C. The case 200 includes a box unit 307 and a channel forming unit 306 protruding from the box unit 307 in the −Z direction, and the print element board 303 is arranged on the channel forming unit 306. Specifically, the print element board 303 is arranged on the bottom surface of the channel forming unit 306 in the case 200, and ejects the liquids during liquid ejection at a position close to the printing medium 103 owing to the protruding channel forming unit 306.

The absorber 300 is composed of a fibrous body, a porous body, or the like, and is capable of retaining the ink inside by exerting capillary force. The absorber 300 is stored in the tank chamber 302 in the case 200 in contact with the filter 301 for trapping foreign particles, and the liquid in the absorber 300 is supplied to the print element board 303 via the filter 301 and the channel section.

The lid 201 is arranged to close the opening of the case 200 and defines the tank chambers 302 in which the absorbers 300 are stored. The lid 201 is provided with air communication holes and is capable of drawing air into the inside from the outside to compensate for the consumption of the liquids in the absorbers 300 as a result of the ejection.

Figure 4:
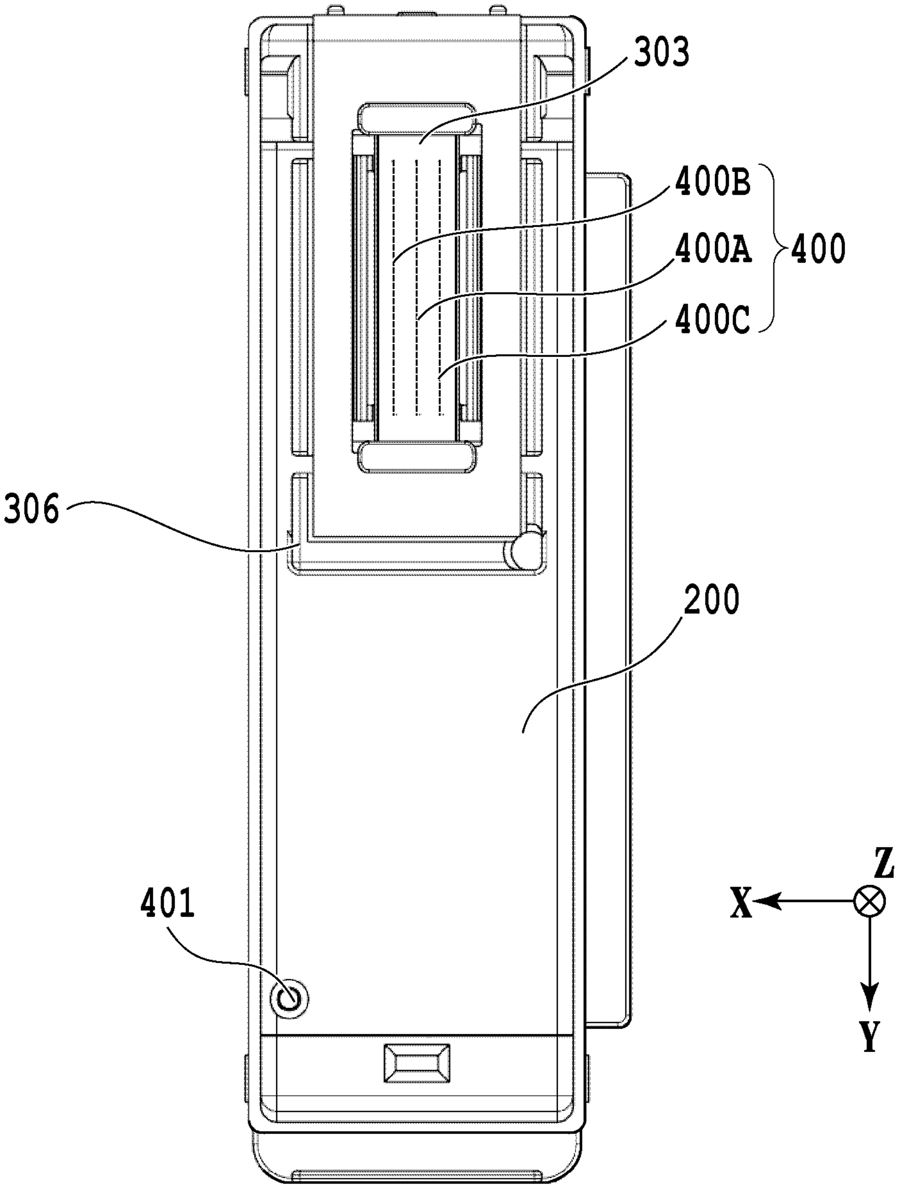
FIG. 4 is a plan view illustrating the bottom surface of the cartridge.

FIG. 4 is a plan view illustrating the bottom surface of the cartridge 100 in the present embodiment. The print element board 303 is provided on the bottom surface of the protruding channel forming unit 306 in the cartridge 100. In the print element board 303, ejection port arrays 400A, 400B, and 400C each including multiple ejection ports arrayed are provided. The print element board 303 ejects the inks from the ejection port arrays 400A, 400B, and 400C. At an end of the bottom surface of the case 200, a gate mark of a secondary gate (gate section) into which a resin is injected during case manufacturing is formed. For convenience of description, the secondary gate mark 401 formed in the case 200 will be also simply referred to as the secondary gate 401. The secondary gate 401 will be described later.

Figure 5C:
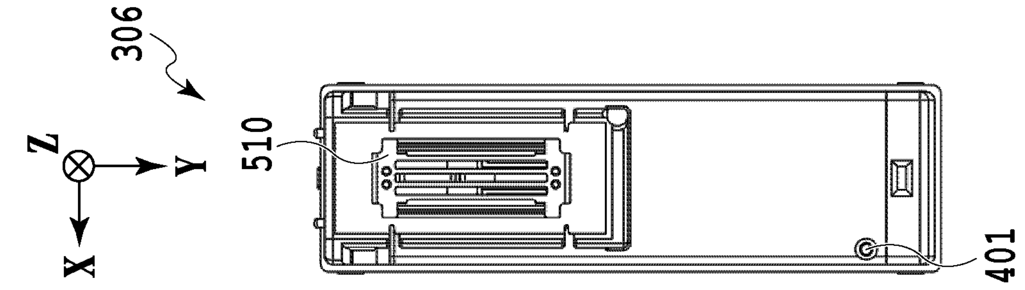
FIG. 5C is a view illustrating the case.
Figure 5B:
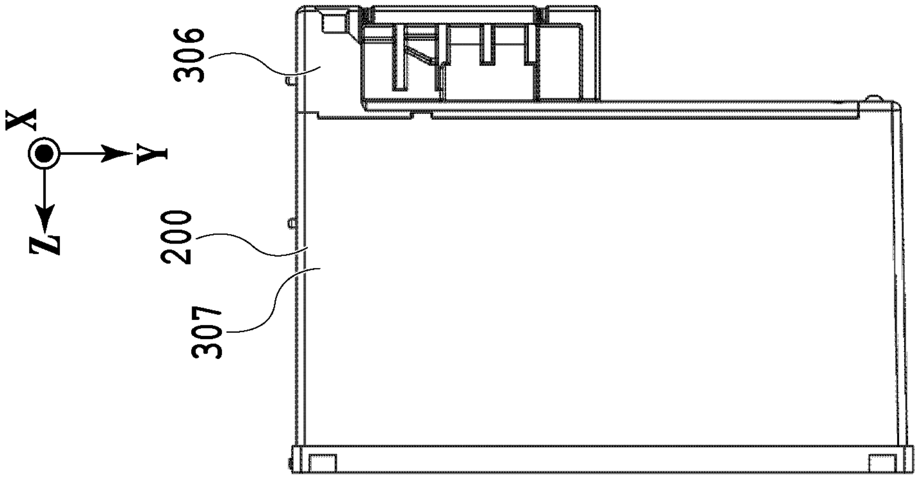
FIG. 5B is a view illustrating the case.
Figure 5A:
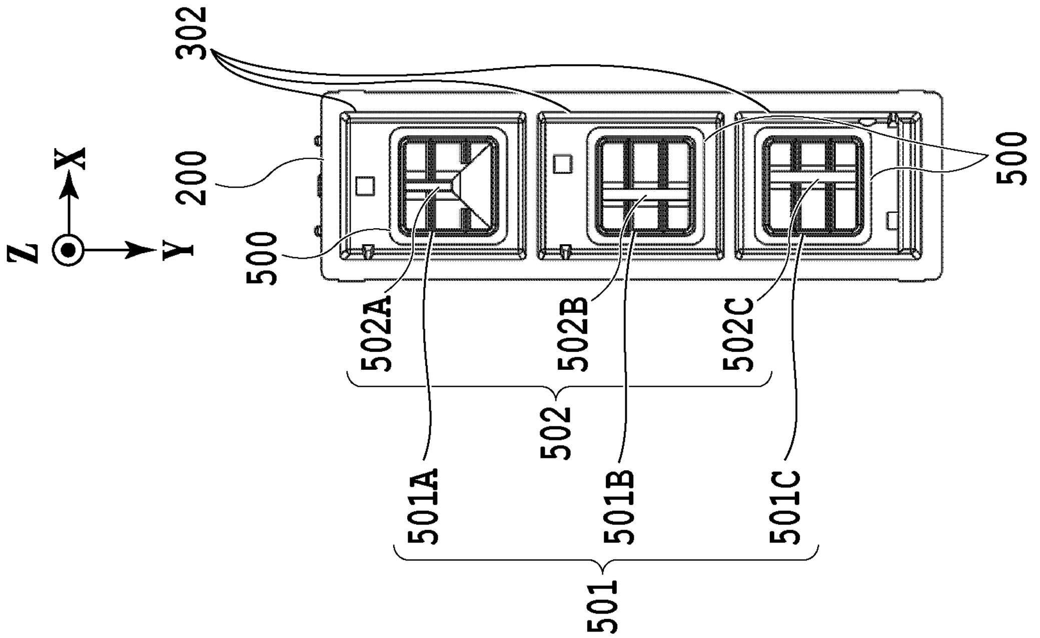
FIG. 5A is a view illustrating a case.

FIG. 5A is a top view of the case 200, FIG. 5B is a side view of the case 200, and FIG. 5C is a bottom view of the case 200 in the present embodiment. The case 200 in the present embodiment is formed by joining the box unit 307 in which the tank chambers 302 are formed and the channel forming unit 306 in which the channel section internally including a combination of multiple ink channels is formed. As illustrated in FIG. 5A, a filter surface 500 for bonding the filter 301 is formed in the bottom of each tank chamber 302 and a first opening 501 is provided in the filter surface 500. A second opening 502 is formed on the −Z direction side of the first opening 501. As illustrated in FIG. 5B, the case 200 is formed by individually molding the box unit 307 and the channel forming unit 306 (primary molding) and then joining these units 307 and 306 together (second molding). As illustrated in FIG. 5C, a mount surface 510 for mounting the print element board 303 is formed in the bottom surface of the channel forming unit 306. The secondary gate 401 is arranged at a position far from the mount surface 510.

FIGS. 11A to 11D are diagrams illustrating steps of manufacturing the case 200 in sequence in the present embodiment. The case 200 is manufactured using an in-mold molding technology in which a resin is injected into a mold. Hereafter, the in-mold molding technology will be described sequentially. The case 200 is manufactured in a primary molding and a secondary molding. A mold for use to mold the case 200 is divided into a fixed mold 1100 and a movable mold 1110. The box unit 307 and the channel forming unit 306 are individually molded in the primary molding, and then the box unit 307 and the channel forming unit 306 molded in the primary molding are stacked and joined together in the secondary molding. In the manufacturing of the case 200, the primary molding and the secondary molding are performed by using the same molds as described above.

Figure 11A:
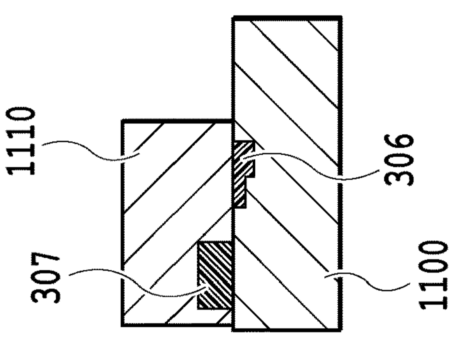
FIG. 11A is a diagram illustrating a step of manufacturing a case in sequence.
Figure 11B:
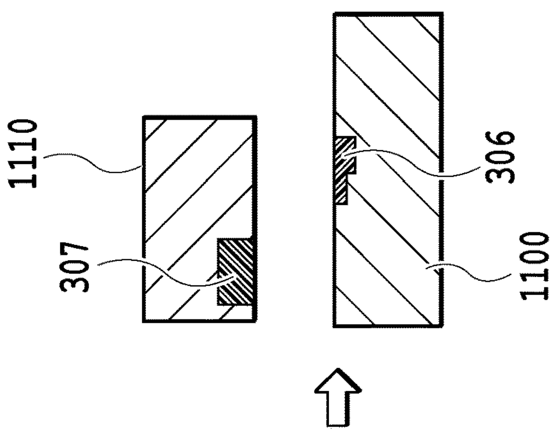
FIG. 11B is a diagram illustrating a step of manufacturing the case in sequence.
Figure 11C:
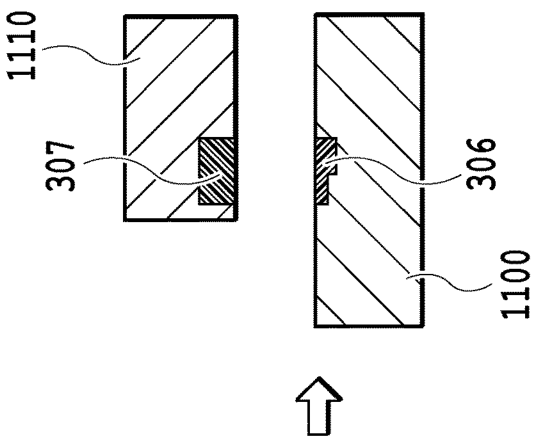
FIG. 11C is a diagram illustrating a step of manufacturing the case in sequence.
Figure 11D:
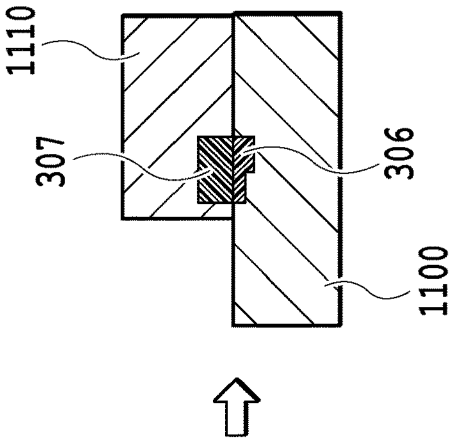
FIG. 11D is a diagram illustrating a step of manufacturing the case in sequence.

First, as illustrated in FIG. 11A, the box unit 307 and the channel forming unit 306 are individually molded (the primary molding). Specifically, a resin is injected from a primary gate not illustrated into the fixed mold 1100 and the movable mold 1110 clamped at first relative positions to form the channel forming unit 306 in the fixed mold 1100 and form the box unit 307 in the movable mold 1110. After that, as illustrated in FIG. 11B, the movable mold 1110 is separated from the fixed mold 1100. Next, as illustrated in FIG. 11C, the movable mold 1110 is moved relative to the fixed mold 1100 in a direction crossing the direction of the aforementioned separation. In the moving of the movable mold 1110, the movable mold 1110 is moved to a position where the box unit 307 can be stacked on the channel forming unit 306 if the fixed mold 1100 and the movable mold 1110 are closed. FIG. 11C illustrates a state where the moving of the movable mold 1110 is completed. After that, as illustrated in FIG. 11D, the fixed mold 1100 and the movable mold 1110 are closed again. As the molds are closed, the box unit 307 is stacked on the channel forming unit 306 within the molds and a secondary channel for the secondary molding is formed between the box unit 307 and the channel forming unit 306. Then, the box unit 307 and the channel forming unit 306 are joined together by injecting a molten resin from the secondary gate 401 arranged in the channel forming unit 306 into the fixed mold 1100 and the movable mold 1110 clamped at second relative positions (the secondary molding). In the secondary molding, the joining is performed within the molds, which makes it possible to perform the joining with high accuracy at low cost. The secondary channel will be described in detail later.

As another bonding method, for example, an adhesive agent may be used. However, if the adhesive agent is used, a step of curing the adhesive agent is needed. In addition, welding methods such as ultrasonic welding and laser welding are not suitable to stack and press complex shapes against each other to weld them.

As a result of joining the box unit 307 and the channel forming unit 306 together in the secondary molding, an ink channel section through which the tank chambers 302 communicate with the ejection port arrays 400 in the print element board 303 is formed. The channel section will be described in detail later.

In the formation of the case 200, a hot runner (system for supplying a resin while melting the resin) is placed in the molds around the primary gate (not illustrated) and the secondary gate 401. Use of the hot runner makes it possible to shorten a molding cycle. Since the hot runner is at a high temperature, it is preferable to arrange the secondary gate 401 far from a portion requiring a high accuracy such as the mount surface 510 for mounting the print element board 303 as illustrated in FIG. 5C. As the secondary gate 401 is arranged far away, it is possible to prevent generation of a sink mark in or deformation of the mount surface 510.

Figure 6:
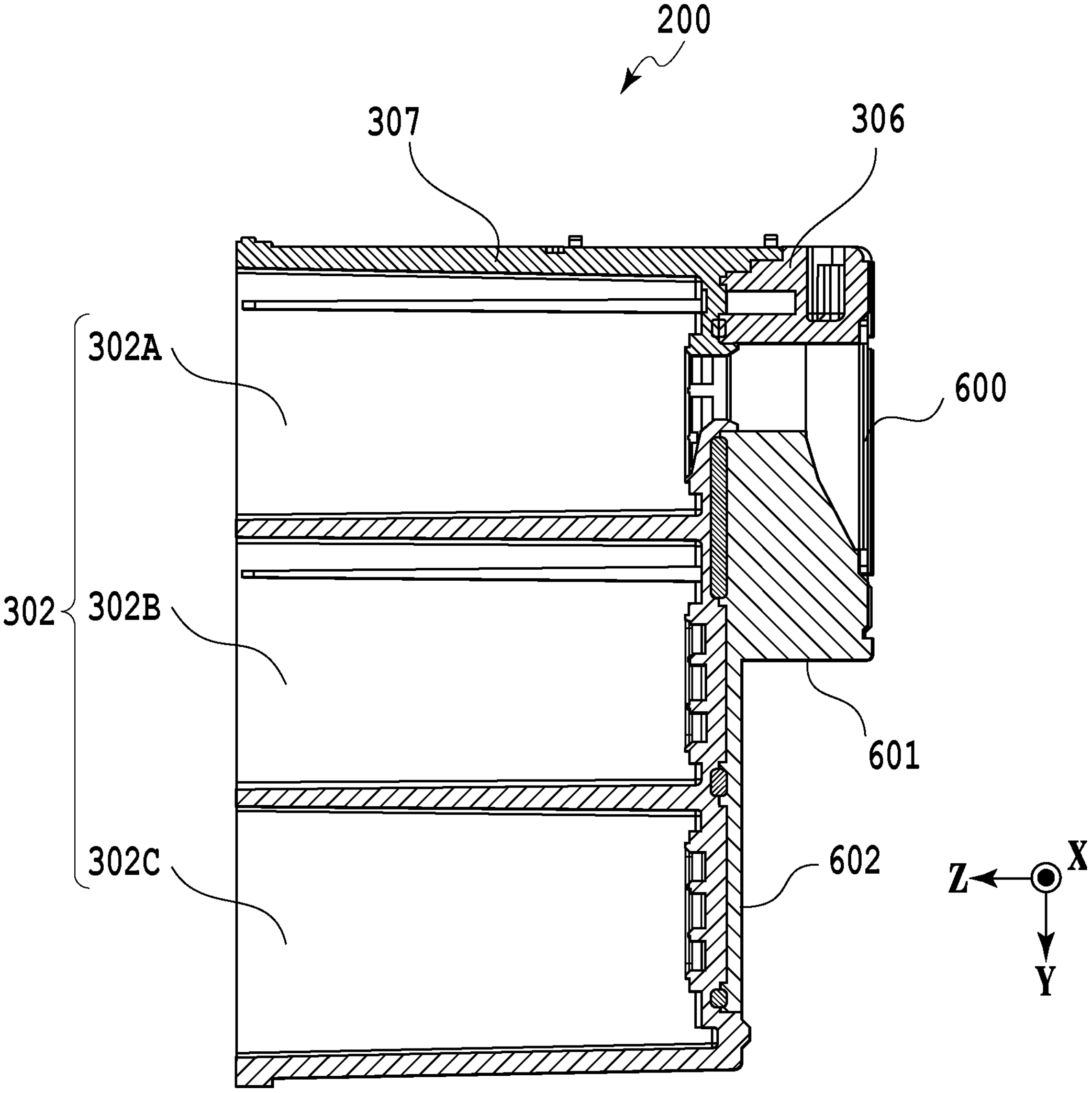
FIG. 6 is a cross-sectional view illustrating the case.

FIG. 6 is a cross-sectional view illustrating the case 200. The channel forming unit 306 of the case 200 is provided with a first surface 600 on which the mount surface 510 for mounting the print element board 303 is provided, and a second surface 602 that is coupled to the first surface 600 via a step portion 601 and located one step down toward the tank chambers 302. The second surface 602 is arranged at the back of the bottoms of the tank chambers 302.

Figure 7:
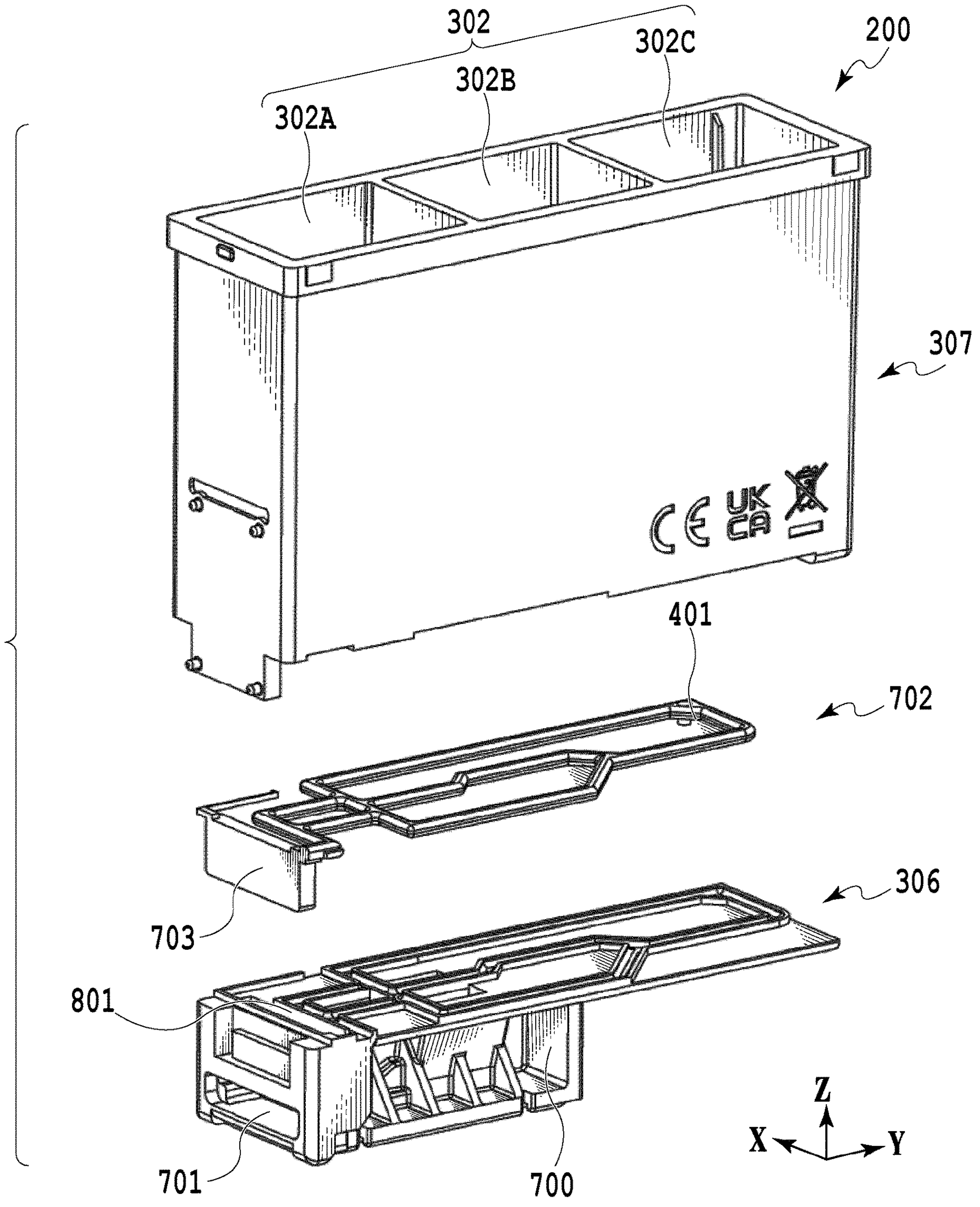
FIG. 7 is an exploded perspective view illustrating the case.
Figure 8A:
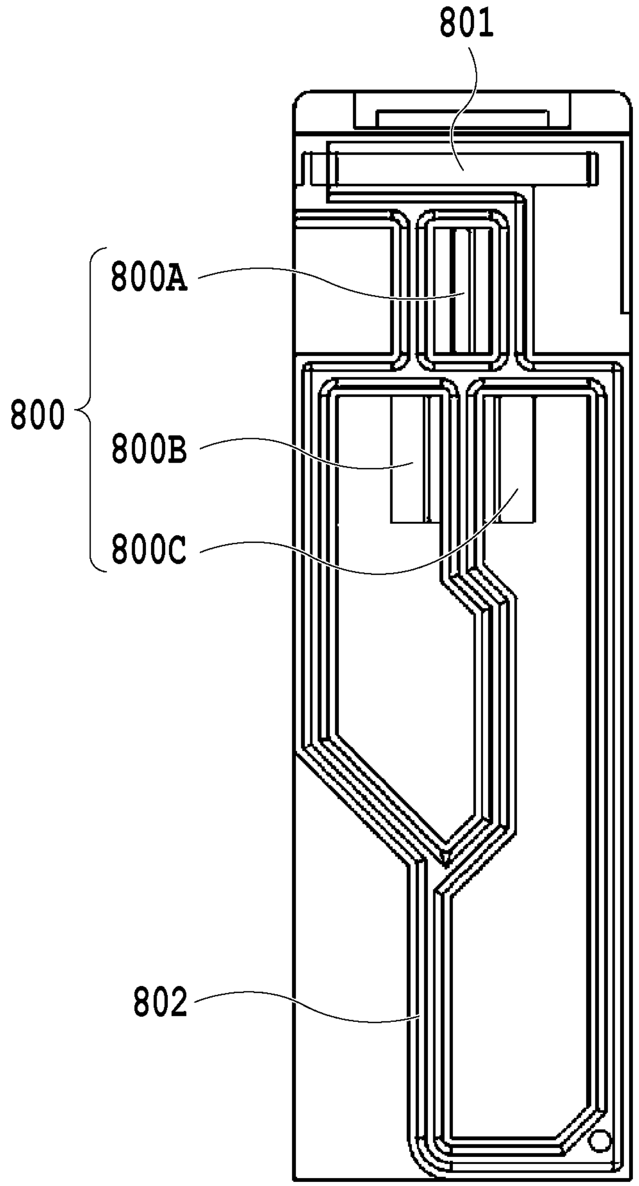
FIG. 8A is a view illustrating a channel forming unit.
Figure 8B:
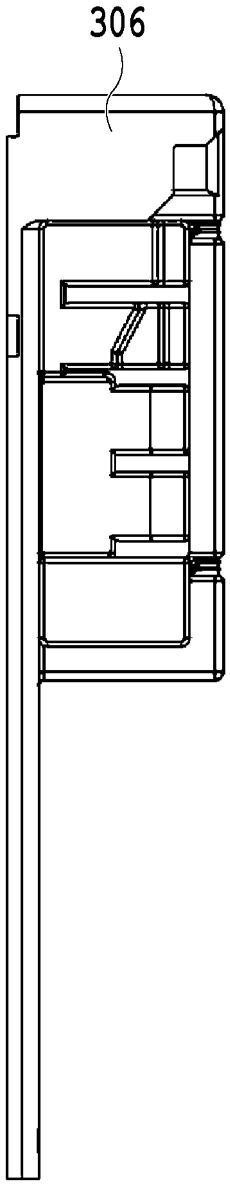
FIG. 8B is a view illustrating the channel forming unit.
Figure 9B:
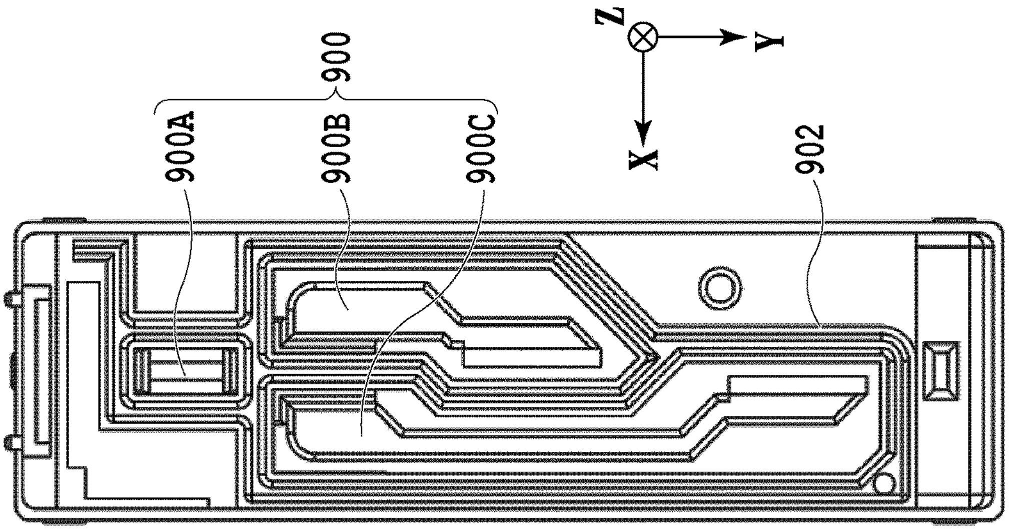
FIG. 9B is a view illustrating the box unit.
Figure 9A:
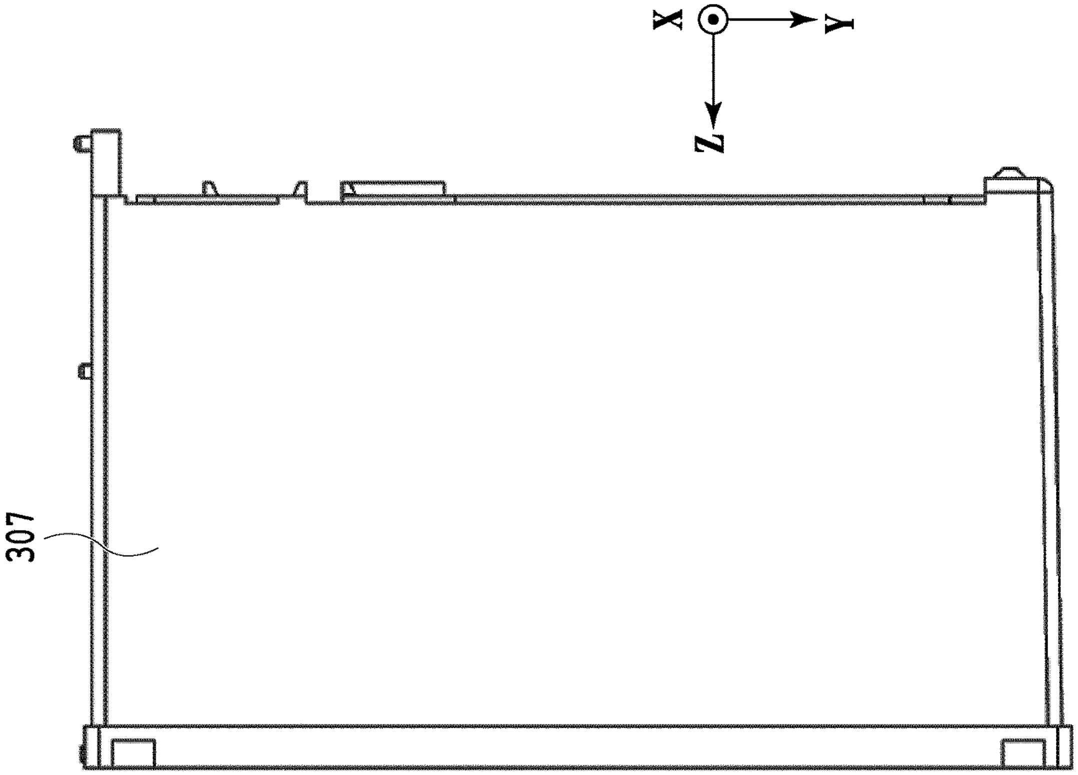
FIG. 9A is a view illustrating a box unit.

FIG. 7 is an exploded perspective view illustrating the case 200. FIGS. 8A and 8B are a top view and a side view illustrating the channel forming unit 306 before the secondary molding. FIGS. 9A and 9B are a side view and a bottom view illustrating the box unit 307 before the secondary molding. The case 200 is divided into the box unit 307 in which the tank chambers 302 (302A, 302B, and 302C) are provided and the channel forming unit 306 to which the print element board 303 is to be bonded and in which the ink channels are formed. In the box unit 307, the tank chambers 302 are arranged side by side in the Y direction, that is, the ejection port array direction.

In the channel forming unit 306, ink channels 800 (800A, 800B, and 800C) (see FIG. 8A) for supplying the inks to the respective ejection port arrays 400A, 400B, and 400C in the print element board 303 are formed.

As illustrated in FIG. 7, first cavities 700 are provided on both sides of the channel forming unit 306 in the X direction, and a second cavity 701 is provided at the end of the channel forming unit 306 in the −Y direction. In the secondary molding, the box unit 307 and the channel forming unit 306 are joined together by injecting the resin into the secondary channel between the box unit 307 and the channel forming unit 306. A joining resin (joint unit) 702 is a unit that is formed by injecting the resin into the secondary channel from the secondary gate 401 in the secondary molding, and that functions to join the box unit 307 and the channel forming unit 306 together. In the joining resin 702, a buffer 703 (finally-filled portion) is formed. The buffer 703 is a place that the resin injected from the secondary gate 401 finally reaches, and thus functions as a buffer for the resin. In other words, in the secondary channel formed by stacking the box unit 307 on the channel forming unit 306, a space where the resin injected from the secondary gate 401 can be accumulated in the finally-filled portion is formed. Hereafter, this space will be referred to as a buffer section 801. The resin stored in the buffer section 801 forms the buffer 703 of the joining resin 702. The amount of the resin flowing in the secondary channel can be adjusted to an optimal amount with the resin accumulated in the buffer section 801.

Moreover, the first cavities 700 are formed on both sides of the channel forming unit 306 in the X direction in the primary molding. Thus, in the secondary molding, the lower side of the secondary channel can be supported by mold pieces inserted into the first cavities 700. This makes it possible to prevent the channel forming unit 306 from partly melting and collapsing due to the heat of the flowing resin. The channel forming unit 306 is provided with the buffer section 801 capable of being filled with the resin and the resin finally reaches the buffer section 801 during the filling. In the finally-filled portion of the molten resin, the excessively filled resin is stored in the buffer section 801.

In the bottom surface of the box unit 307, ink channels 900 (900A, 900B, and 900C) (see FIG. 9A) for supplying the inks to the respective ejection port arrays 400A, 400B, and 400C in the print element board 303 are formed. With the box unit 307 and the channel forming unit 306 joined together, the ink channel 800A and the ink channel 900A are joined to form a channel which couples the tank chamber 302A and the ejection port array 400A. With the box unit 307 and the channel forming unit 306 joined together, the ink channel 800B and the ink channel 900B are joined to form a channel that couples the tank chamber 302B and the ejection port array 400B. With the box unit 307 and the channel forming unit 306 joined together, the ink channel 800C and the ink channel 900C are joined to form a channel which couples the tank chamber 302C and the ejection port array 400C.

As illustrated in FIGS. 8A, 8B, 9A, and 9B, grooves 802 and 902 as portions where the resin is to flow are formed in the channel forming unit 306 and the box unit 307 so that the secondary channel for the resin can be formed with these units 306 and 307 combined together. The groove 802 is formed to avoid the ink channels 800 and the groove 902 is formed to avoid the ink channels 900. The grooves 802 and 902 will be described in detail later.

Figure 10:
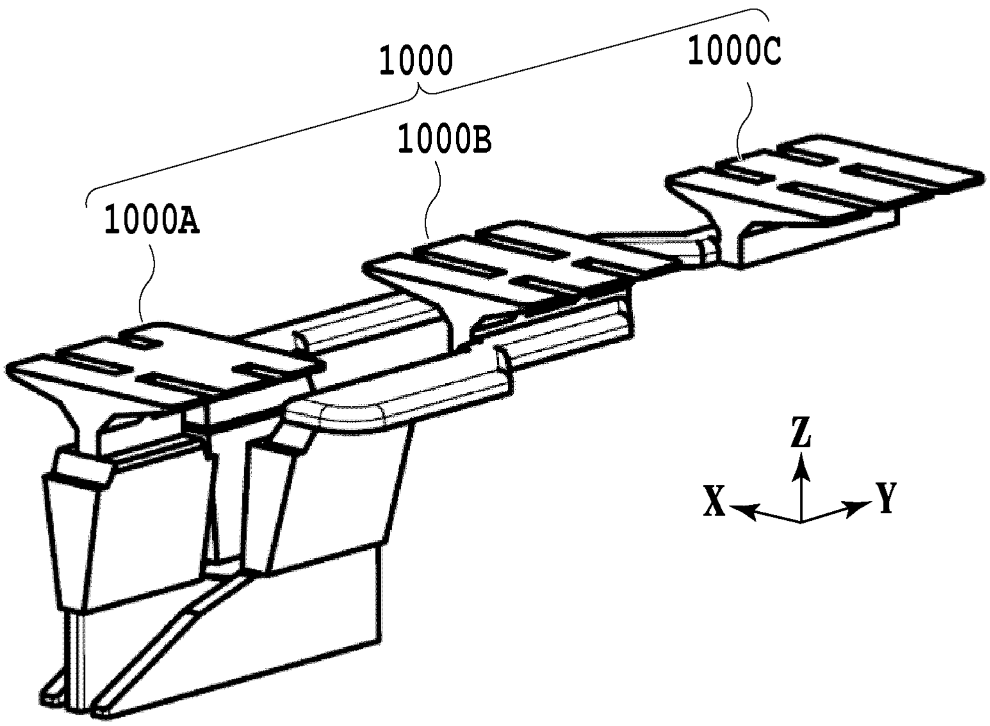
FIG. 10 is a perspective view illustrating a channel section modeled by extracting a space to form channels.

FIG. 10 is a perspective view illustrating a channel section 1000 modeled by extracting a space to form the ink channels. The channel section 1000 is a model of the extracted ink channels, and includes ink channels (1000A, 1000B, and 1000C) for three colors. The channels are independent of each other and are arranged in the order of the channels 1000A, 1000B, and 1000C in the Y direction. The channel section 1000 is configured to be capable of supplying the liquids in the tank chambers 302 to the print element board 303. The channel section 1000 is formed with the box unit 307 and the channel forming unit 306 joined together.

In the secondary molding, it is desirable to use a thermoplastic resin that has a higher melting point than that of the resin used for the box unit 307 and the channel forming unit 306, and it is even more desirable to use a resin having good fluidity because the resin can flow throughout even a complex shape. Furthermore, if the resins based on the same substance are used in the primary molding and the secondary molding, the two materials can be more melted together and bonded more firmly. However, the materials for the resins used are not limited to the above.

Figure 12:
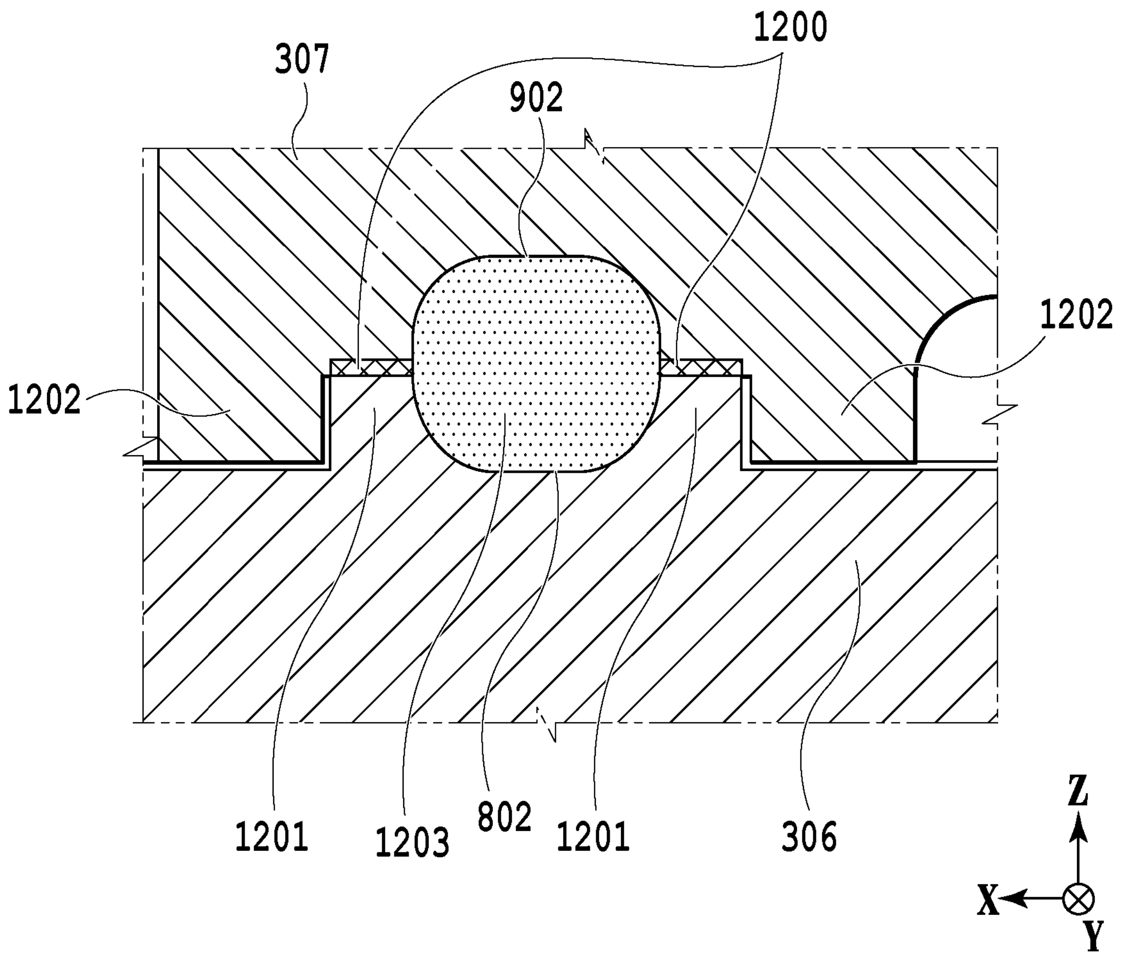
FIG. 12 is an enlarged partial cross-sectional view illustrating a secondary channel.
Figure 13A:
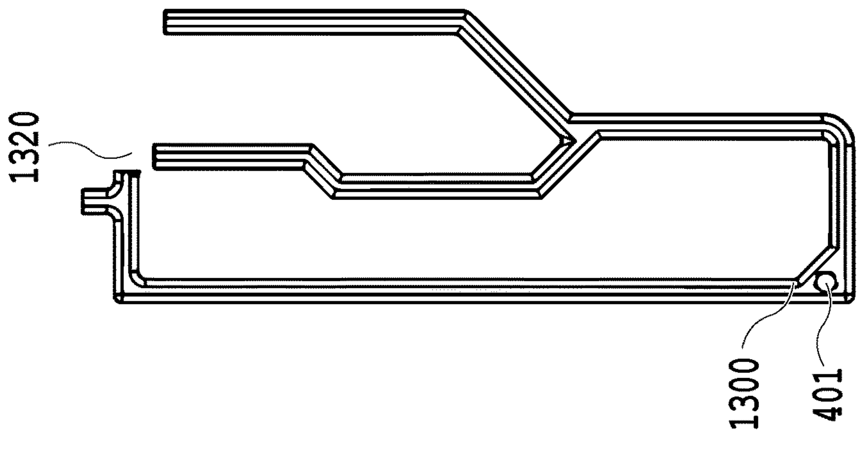
FIG. 13A is a view illustrating a resin filling process in a secondary molding in sequence.
Figure 13B:
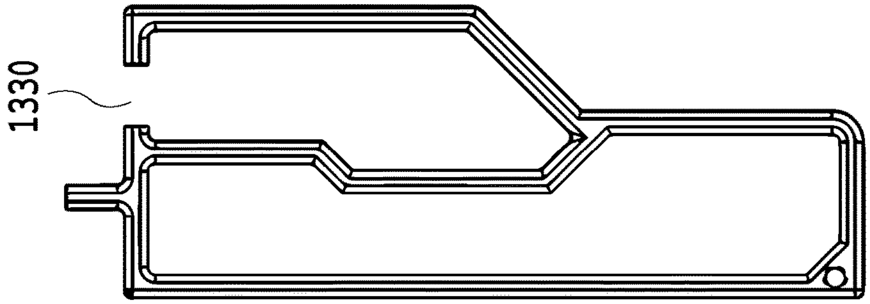
FIG. 13B is a view illustrating a resin filling process in the secondary molding in sequence.
Figure 13C:
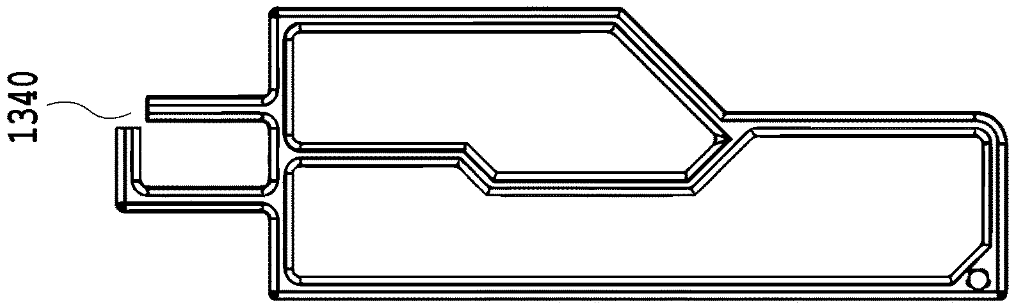
FIG. 13C is a view illustrating a resin filling process in the secondary molding in sequence.
Figure 13D:
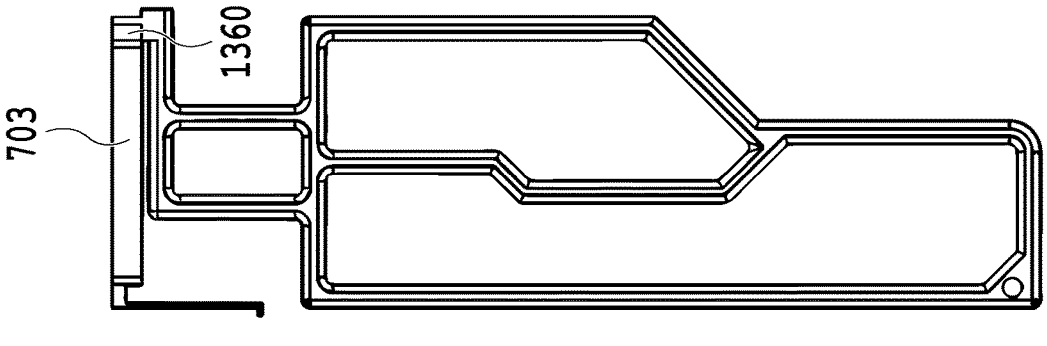
FIG. 13D is a view illustrating a resin filling process in the secondary molding in sequence.

FIG. 12 is an enlarged partial cross-sectional view illustrating a secondary channel 1203 where the resin flows in the secondary molding illustrated in FIG. 11B. In the secondary molding, a clamping margin 1200 of about 0.1 mm for mold clamping is provided between the box unit 307 and the channel forming unit 306, and thus the resin is prevented from leaking from the secondary channel 1203. In a case when the groove 902 is formed in the joint surface of the box unit 307 and the groove 802 is formed in the joint surface of the channel forming unit 306 to form the secondary channel 1203 through which the resin flows as in the present embodiment, the surface areas for the bonding are larger than the surface areas for the bonding with no grooves formed, so that the bonding strength can be enhanced. However, it is not necessary to form both of the grooves 902 and 802. The groove may be provided in only any one of the joint surfaces of the box unit 307 and the channel forming unit 306. Regarding the cross section of the secondary channel 1203, it is desirable that the width in the X direction be 1 mm or more and the height in the Z direction be 1 mm or more in order that the resin can flow with low flow resistance. However, an excessively large cross section of the secondary channel 1203 is not desirable because the cartridge size becomes too large.

Furthermore, ribs 1201 are provided on both sides of the groove 802 in the channel forming unit 306, and ribs 1202 are provided on both sides of the groove 902 in the box unit 307 at positions between which the ribs 1201 are sandwiched. As the resin flows in the secondary channel 1203, the ribs 1201 on both sides of the groove 802 fall down outward so as to widen the groove 802. The fallen ribs 1201 are supported by the ribs 1202 in the box unit 307, so that the resin is prevented from leaking out from the secondary channel 1203. The width of the ribs 1202 in the X direction is desirably 1 mm or more. Having a width of 1 mm or more, the ribs 1202 can prevent the secondary channel 1203 from collapsing due to the heat of the resin flowing in the secondary channel 1203.

FIGS. 13A to 13D are views illustrating resin filling processes in the secondary molding in sequence. In other words, FIGS. 13A to 13D illustrate the processes in which the resin injected into the secondary channel 1203 is forming the joining resin 702. In the secondary molding, the resin is filled from the secondary gate 401 and enters the secondary channel 1203. In the vicinity of the secondary gate 401 in the secondary channel 1203, a wide space section 1300 having a widened space is provided because the filling pressure is high. The pressure of the resin filled is reduced due to the presence of the wide space section 1300. The resin reduced in pressure in the wide space section 1300 then fills the secondary channel 1203 while branching in the secondary channel 1203. During the filling processes, the branched resins merge at a first merging point 1320 illustrated in FIG. 13A, merge at a second merging point 1330 illustrated in FIG. 13B, and then merge at a third merging point 1340 illustrated in FIG. 13C. As illustrated in FIGS. 11A to 11C, the secondary channel 1203 is formed without forming any dead end at each of the merging points, thereby preventing generation of voids.

Since a buffer inlet 1360 and the buffer section 801 are provided for the finally-filled portion of the resin, the air present in the secondary channel 1203 during the filling finally enters the buffer section 801. The buffer 703 itself does not significantly contribute to the joining of the box unit 307 and the channel forming unit 306, and is designed to have a large volume. For this reason, even if the air enters the buffer section 801 and generates a void, the void does not have a large influence. In order that the resins can merge without generating any void in the secondary channel 1203 during the filling processes, the secondary gate 401 is arranged at a position diagonal from the buffer inlet 1360. In other words, the buffer section 801 is formed at one end of the channel forming unit 306, whereas the secondary gate 401 is provided at the other end of the channel forming unit 306.

As the resin enters the buffer section 801 via the buffer inlet 1360, the filling is completed. Then, the resin is cured over time. The amount of the resin to be filled is set such that the buffer section 801 will be filled to about half, which prevents the resin from running short or overflowing. Even if there is some variation in the amount of the resin filled in the secondary molding, the buffer section 801 thus provided makes it unlikely that the variation will affect the quality of the molded case 200. The resin is cured after the resin filling, so that the box unit 307 and the channel forming unit 306 are joined together.

Figure 14:
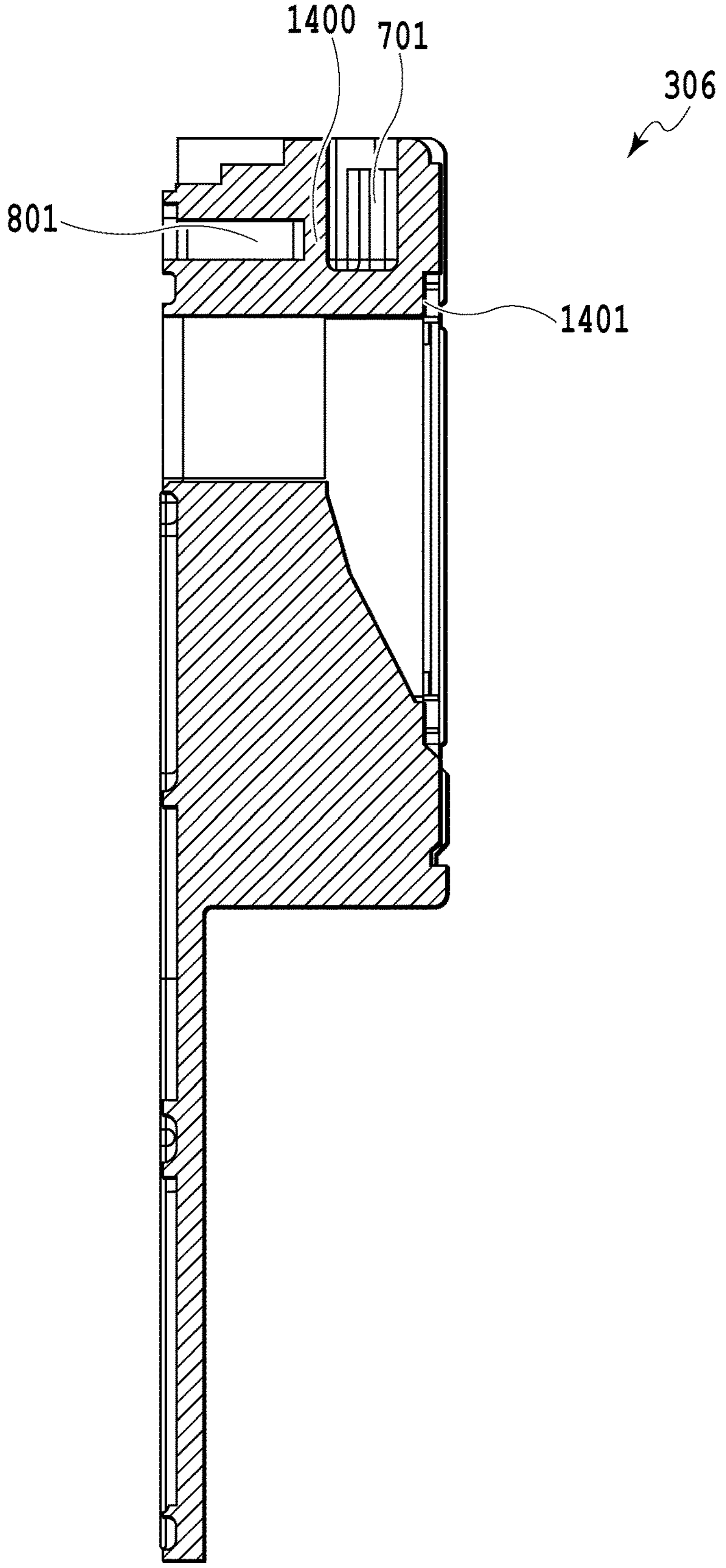
FIG. 14 is a cross-sectional view illustrating the channel forming unit.

FIG. 14 is a cross-sectional view illustrating the channel forming unit 306. In the channel forming unit 306, the second cavity 701 described with FIG. 7 and a wall 1400 is formed below the buffer section 801. The presence of the wall 1400 suppresses deformation of a mount surface 1401 due to the heat of the molten resin flowing into the buffer section 801. Furthermore, the second cavity 701 is formed in the primary molding. Then, in the secondary molding, even if the resin is accumulated in the buffer section 801, the resin can be supported via the wall 1400 by a mold piece inserted into the second cavity 701. Thus, the wall 1400 is prevented from collapsing due to the heat of the resin. Since the mold piece is made of a metal, deformation of the mount surface 1401 due to the heat is prevented by a heat release effect of the mold piece.

Figure 15:
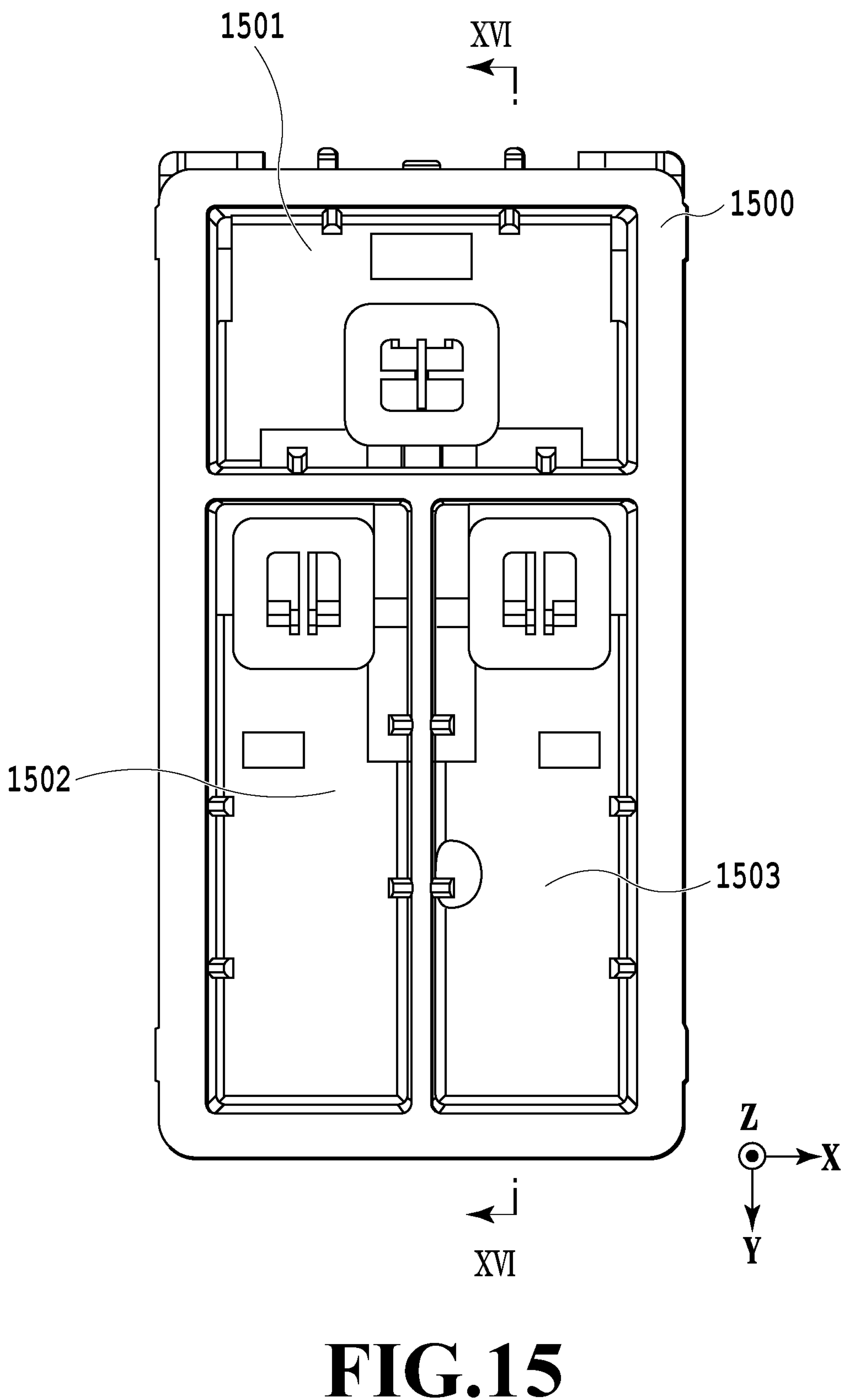
FIG. 15 is a top view illustrating an ink cartridge in the related art.

FIG. 15 is a top view illustrating an ink cartridge 1500 disclosed in Japanese Patent Laid-Open No. 2008-260199. As in FIG. 15, the conventional ink cartridge 1500 includes tank chambers 1501, 1502, and 1503 that are three regions partitioned adjacent to each other, and an absorber is arranged in each of the regions. The X direction is the scanning direction, and the multiple absorbers are arranged in the scanning direction in the conventional structure. This structure poses a concern that the apparatus may become larger in size due to a larger width of the case in the scanning direction.

Figure 16:
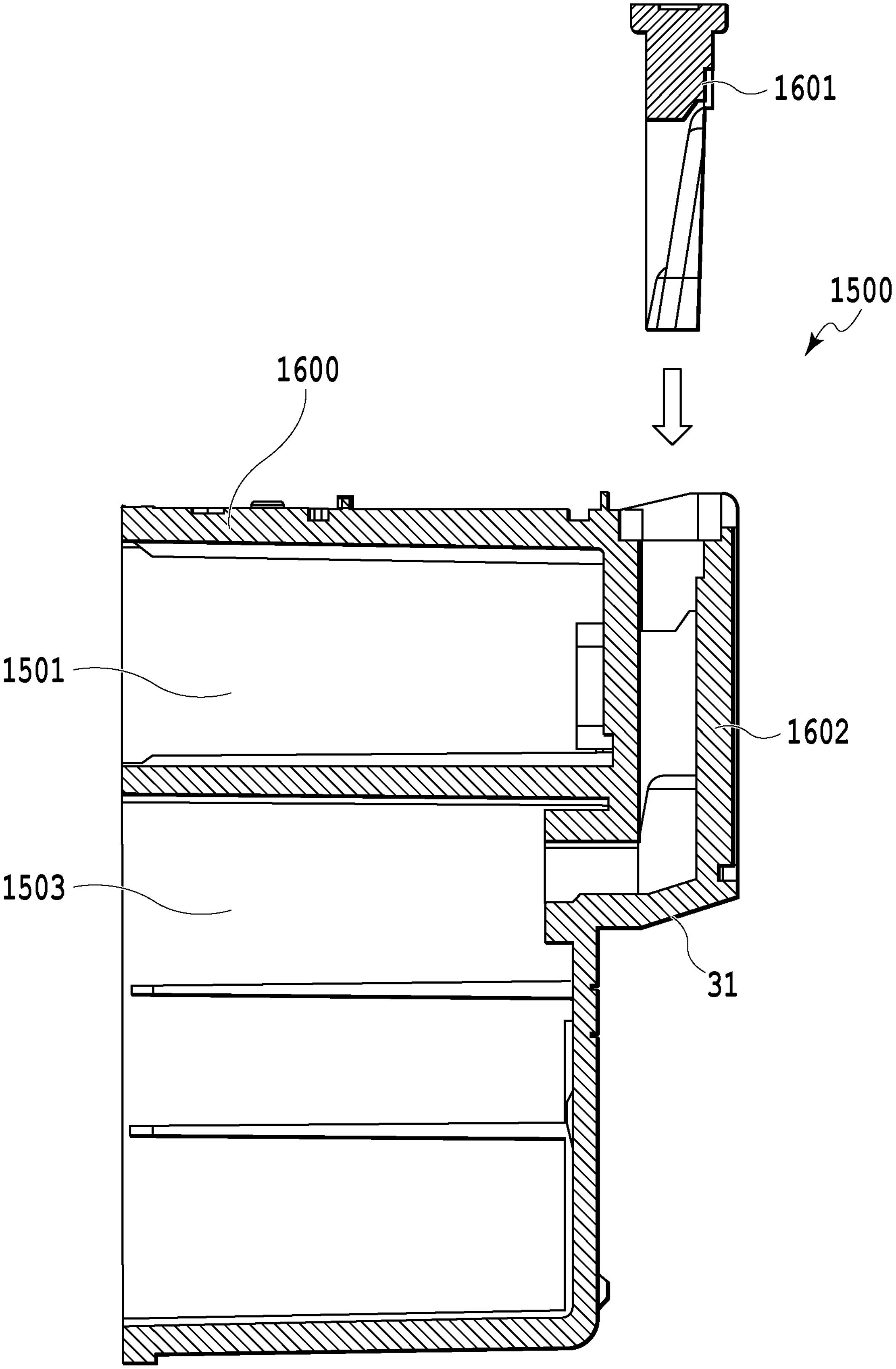
FIG. 16 is a view illustrating a cross section taken along XVI-XVI in FIG. 15.

FIG. 16 is a view illustrating a cross section of the ink cartridge taken along XVI-XVI in FIG. 15.

In the conventional ink cartridge 1500, channels from the tank chambers 1501, 1502, and 1503 to a first surface 1602, to which a print element board is to be bonded, are formed by inserting a channel plate 1601 into a tank case 1600 in an arrow direction and welding the channel plate 1601 to the tank case 1600.

In the case where all the tank chambers 1501, 1502, and 1503 have regions close to the print element board as in the ink cartridge 1500, the channels from the tank chambers 1501, 1502, and 1503 to the first surface 1602 can be formed by using the channel plate 1601.

However, in a structure in which the tank chambers 302 are provided such that the absorbers 300 are arranged linearly in the cartridge 100 as in the present embodiment, one or some of the tank chambers 302 are arranged at positions far from the print element board. For this reason, it is difficult to form all the channels in the method using the channel plate 1601 in the related art.

To address this, the case 200 is configured to be divided into the box unit 307 and the channel forming unit 306, the box unit 307 and the channel forming unit 306 are individually molded in the primary molding, and the box unit 307 and the channel forming unit 306 are joined together by injecting the resin between them in the secondary molding. Accordingly, it is possible to provide a cartridge, a printing apparatus, and a cartridge production method, which can enhance a degree of freedom in designing the cartridge and prevent an increase in the size of the apparatus.

Second Embodiment

Hereafter, a second embodiment of the disclosure will be described with reference to the drawings. Since the basic structure of the present embodiment is the same as that of the first embodiment, a characteristic structure will be described below.

Figure 17B:
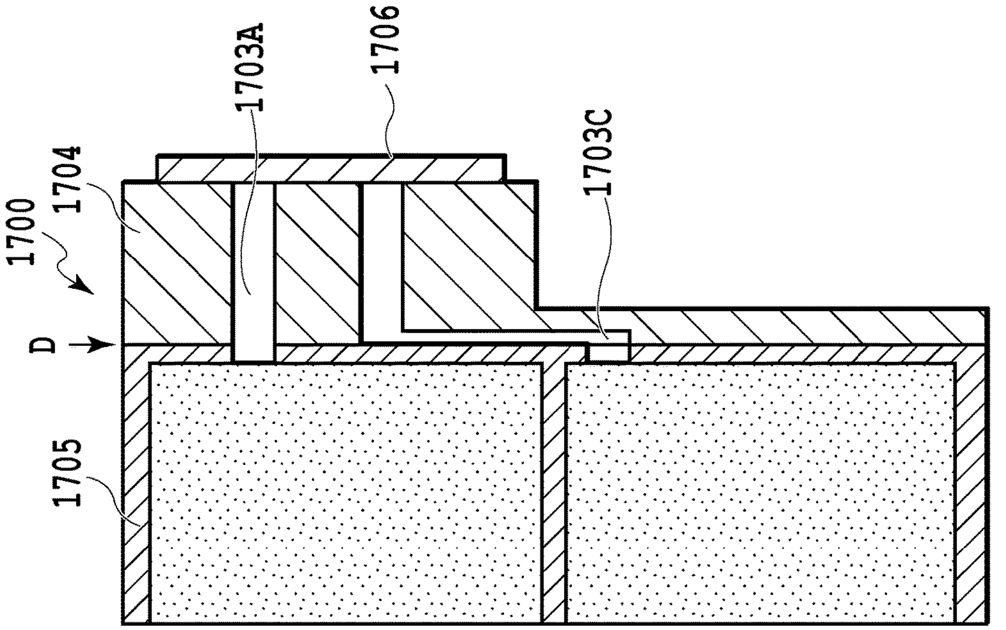
FIG. 17B is a view illustrating the case.
Figure 17A:
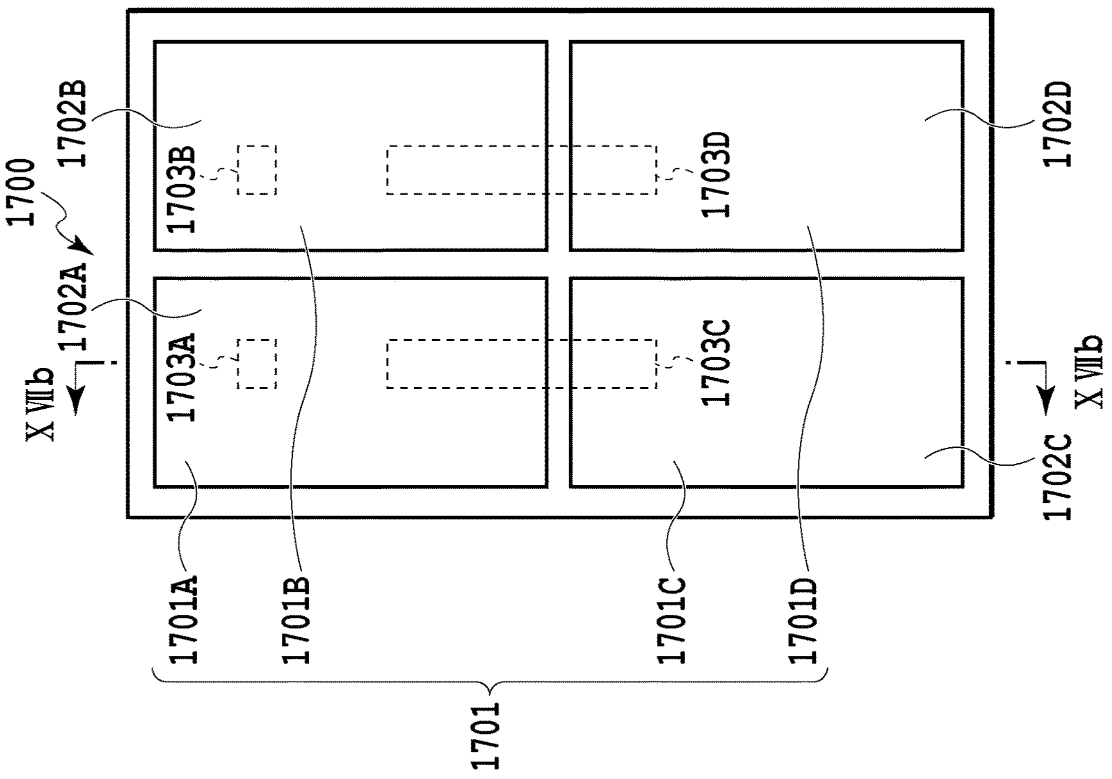
FIG. 17A is a view illustrating a case.

FIG. 17A is a top view of a case 1700 in the present embodiment and FIG. 17B is a cross-sectional view taken along XVIIb-XVIIb in FIG. 17A. In the present embodiment, the case 1700 includes totally four tank chambers 1701, two in the X direction and two in the Y direction. The tank chamber 1701A stores an absorber 1702A and is coupled to a print element board 1706 via an ink channel 1703A. The tank chamber 1701C stores an absorber 1702C and is coupled to the print element board 1706 via an ink channel 1703C.

Also, in the arrangement of the tank chambers described above, the case 1700 is configured such that a box unit 1705 and a channel forming unit 1704 can be formed separately. The box unit 1705 and the channel forming unit 1704 are individually molded in the primary molding, and the box unit 1705 and the channel forming unit 1704 are joined together in the secondary molding. Accordingly, it is possible to provide a cartridge, a printing apparatus, and a cartridge production method, which can enhance a degree of freedom in designing the cartridge and prevent an increase in the size of the apparatus.

Third Embodiment

Hereafter, a third embodiment of the disclosure will be described with reference to the drawings. Since the basic structure of the present embodiment is the same as that of the first embodiment, a characteristic structure will be described below.

Figure 18A:
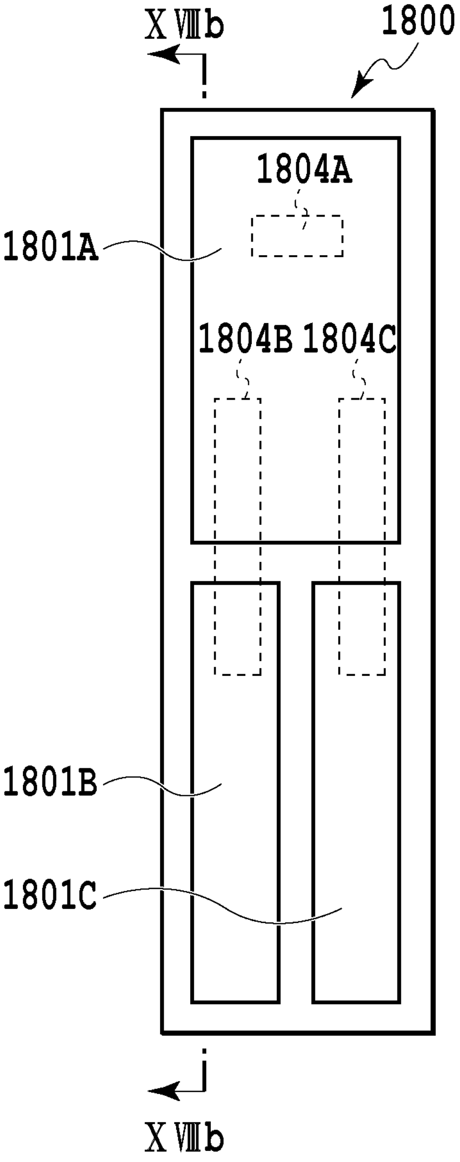
FIG. 18A is a view illustrating a case.
Figure 18B:
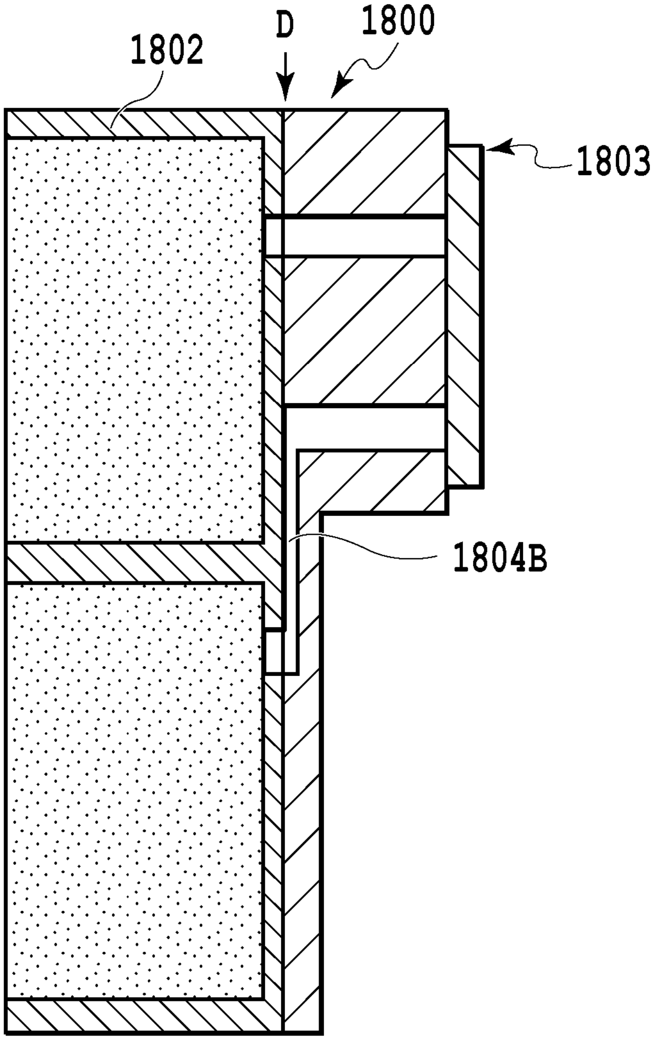
FIG. 18B is a view illustrating the case.

FIG. 18A is a top view of a case 1800 in the present embodiment and FIG. 18B is a cross-sectional view taken along XVIIIb-XVIIIb in FIG. 18A. Regarding the arrangement of tank chambers, the case 1800 in the present embodiment is configured such that tank chambers 1801A, 1801B, and 1801C are provided adjacent to each other as in the structure in the related art. The tank chamber 1801A stores an absorber 1805A and is coupled to a print element board 1806 via an ink channel 1804A.

Also, in the arrangement of the tank chambers described above, the case 1800 is configured such that a box unit 1802 and a channel forming unit 1803 can be formed separately. The box unit 1802 and the channel forming unit 1803 are individually molded in the primary molding, and the box unit 1802 and the channel forming unit 1803 are joined together in the secondary molding. Accordingly, it is possible to provide a cartridge, a printing apparatus, and a cartridge production method, which can enhance a degree of freedom in designing the cartridge and prevent an increase in the size of the apparatus.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A cartridge comprising:
a box unit configured to store a liquid;
a print element board capable of ejecting the liquid from ejection ports arranged in an array;
a channel forming unit in which a channel configured to supply the liquid from the box unit to the print element board is formed, wherein the channel forming unit has a first surface configured to support the print element board and a second surface that is closer to the box unit than is the first surface; and
a joint unit that is formed of a first resin filled in a space formed between the box unit and the channel forming unit and that joins the box unit and the channel forming unit together, wherein the first resin is injected from a gate section provided in the channel forming unit,
wherein, in the space formed between the box unit and the channel forming unit, a buffer section configured to store the first resin excessively filled in a finally-filled portion of the first resin is arranged, the buffer section being formed at one end of the channel forming unit, and the gate section being formed at another end of the channel forming unit, and
wherein, in the channel forming unit, a first cavity is formed between the first surface and the buffer section.

2. The cartridge according to claim 1, wherein the box unit includes a plurality of tank chambers capable of storing different liquids, and,
in the channel forming unit, a plurality of channels configured to supply the respective liquids stored in the plurality of tank chambers are formed.

3. The cartridge according to claim 1, wherein the box unit and the channel forming unit are formed of a second resin, and
the first resin is a thermoplastic resin having a melting point higher than a melting point of the second resin.

4. The cartridge according to claim 2, wherein, in the box unit, the plurality of tank chambers are provided in line.

5. The cartridge according to claim 1, wherein, in the channel forming unit, second cavities are formed in both side surfaces coupled to the first surface and to a surface in which an opening of the first cavity is provided.

6. The cartridge according to claim 4, wherein the box unit is provided with three tank chambers.

7. The cartridge according to claim 6, wherein each of the tank chambers is provided with an absorber configured to retain the liquid.

8. A printing apparatus that is equipped with a cartridge, the cartridge comprising:
a box unit configured to store a liquid;
a print element board capable of ejecting the liquid from ejection ports arrayed;
a channel forming unit in which a channel configured to supply the liquid from the box unit to the print element board is formed, wherein the channel forming unit has a first surface configured to support the print element board and a second surface that is closer to the box unit than is the first surface; and
a joint unit that is formed of a first resin filled in a space formed between the box unit and the channel forming unit and which joins the box unit and the channel forming unit together, wherein the first resin is injected from a gate section provided in the channel forming unit,
wherein, in the space formed between the box unit and the channel forming unit, a buffer section configured to store the first resin excessively filled in a finally-filled portion of the first resin is arranged, the buffer section being formed at one end of the channel forming unit, and the gate section being formed at another end of the channel forming unit, and
wherein, in the channel forming unit, a first cavity is formed between the first surface and the buffer section.

9. A method of producing a cartridge including a box unit configured to store a liquid, a print element board capable of ejecting the liquid from ejection ports that are arranged in an array, and a channel forming unit in which a channel configured to supply the liquid from the box unit to the print element board is formed, the method comprising:
a first forming step of filling a resin into a first mold and a second mold that are clamped at first relative positions to form the box unit inside the first mold and to form the channel forming unit inside the second mold;
a second forming step of filling a resin into the first mold and the second mold that are clamped at second relative positions that are different from the first relative positions to join the box unit and the channel forming unit together, wherein the channel forming unit has a first surface configured to support the print element board and a second surface that is closer to the box unit than is the first surface; and
providing a joint unit that is formed of a first resin filled in a space formed between the box unit and the channel forming unit and that joins the box unit and the channel forming unit together, wherein the first resin is injected from a gate section provided in the channel forming unit,
wherein, in the space formed between the box unit and the channel forming unit, a buffer section configured to store the first resin excessively filled in a finally-filled portion of the first resin is arranged, the buffer section being formed at one end of the channel forming unit, and the gate section being formed at another end of the channel forming unit, and
wherein, in the channel forming unit, a first cavity is formed between the first surface and the buffer section.

10. The printing apparatus according to claim 8, wherein the box unit includes a plurality of tank chambers capable of storing different liquids, and, in the channel forming unit, a plurality of channels configured to supply the respective liquids stored in the plurality of tank chambers are formed.

11. The printing apparatus according to claim 8, wherein the box unit and the channel forming unit are formed of a second resin, and the first resin is a thermoplastic resin having a melting point higher than a melting point of the second resin.

12. The printing apparatus according to claim 8, wherein, in the box unit, the plurality of tank chambers are provided in line.

13. The printing apparatus according to claim 8, wherein, in the channel forming unit, second cavities are formed in both side surfaces coupled to the first surface and to a surface in which an opening of the first cavity is provided.

14. The printing apparatus according to claim 8, wherein the box unit is provided with three tank chambers.

15. The printing apparatus according to claim 14, wherein each of the tank chambers is provided with an absorber configured to retain the liquid.

* * * * *